(12) United States Patent
Frait et al.

(10) Patent No.: US 8,696,518 B2
(45) Date of Patent: Apr. 15, 2014

(54) HYDRAULIC CONTROL FOR POWERSHIFT TRANSMISSION

(75) Inventors: Steven A. Frait, Milan, MI (US); Steven G. Thomas, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 547 days.

(21) Appl. No.: 12/894,261

(22) Filed: Sep. 30, 2010

(65) Prior Publication Data

US 2012/0079905 A1    Apr. 5, 2012

(51) Int. Cl.
 *F16H 61/26* (2006.01)
 *F16H 3/08* (2006.01)
 *B60W 10/02* (2006.01)
 *B60W 10/04* (2006.01)

(52) U.S. Cl.
 USPC .............. 477/156; 477/174; 477/180; 74/330

(58) Field of Classification Search
 USPC ..................... 477/174, 180; 74/330
 See application file for complete search history.

(56) References Cited

U.S. PATENT DOCUMENTS

| | | | | |
|---|---|---|---|---|
| 4,412,461 A | * | 11/1983 | Windsor | 477/79 |
| 4,494,422 A | * | 1/1985 | Funke et al. | 477/131 |
| 7,464,617 B2 | * | 12/2008 | Baldascini et al. | 74/335 |
| 7,617,808 B2 | * | 11/2009 | Aswani et al. | 123/179.3 |
| 8,234,946 B2 | * | 8/2012 | Momal et al. | 74/330 |
| 2006/0194672 A1 | * | 8/2006 | Ochi et al. | 477/76 |
| 2011/0094610 A1 | * | 4/2011 | Yagi | 137/885 |
| 2012/0304815 A1 | * | 12/2012 | Yagi | 74/664 |

* cited by examiner

*Primary Examiner* — Tisha Lewis
(74) *Attorney, Agent, or Firm* — James Dottavio; MacMillan, Sobanski & Todd, LLC

(57) ABSTRACT

A method for controlling a transmission includes using signals of first solenoids to control first and second clutches, servos of first gears and servos of second gears, using signals of a second solenoid to establish a flow rate to cool the clutches and to actuate the servo that is associated with a selected gear, and using signals of a third solenoid to direct the flow rate to one of the clutches and to engage the selected gear.

17 Claims, 2 Drawing Sheets

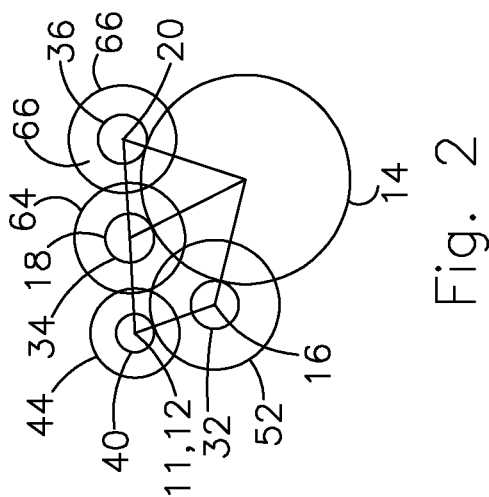
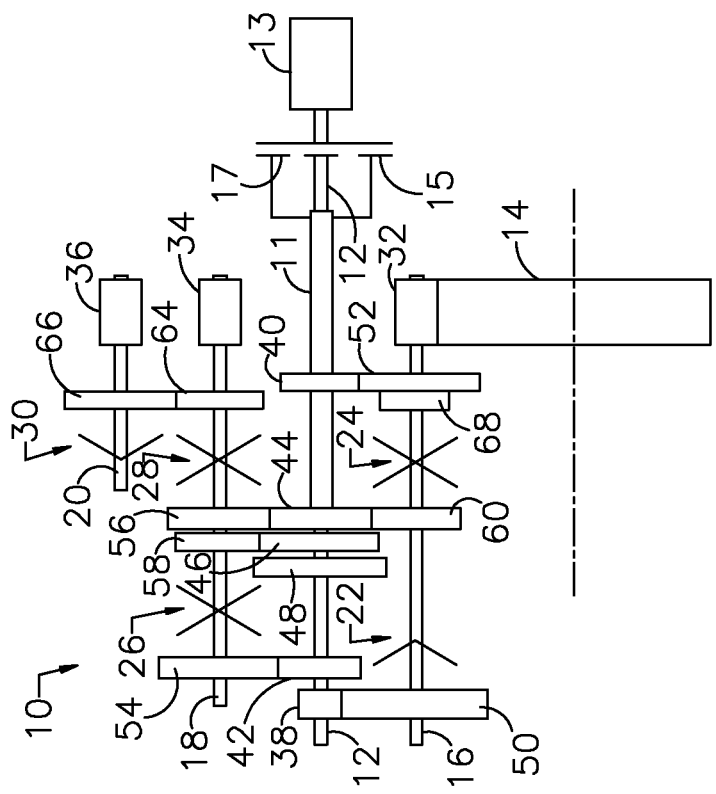

HYDRAULIC CONTROL FOR POWERSHIFT TRANSMISSION

BACKGROUND OF THE INVENTION

1. Field of the Invention

This invention relates generally to a powertrain for a motor vehicle, particularly to the hydraulic control circuit of powershift transmission located in the powertrain.

2. Description of the Prior Art

A dual clutch transmission (DCT), also called a powershift transmission, is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with certain gears; the other input clutch transmits torque between the transmission input and a second layshaft associated with the other gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

A powershift transmission launches the vehicle from a stopped or nearly stopped condition using a start clutch. Due to engine downsizing and boosting for a given vehicle size, boost is not present at launch causing potentially insufficient transmission gear ratio for launching.

A powershift transmission generally has a specific number of gears and provides little design flexibility for accommodating an increase in the number of gears to five, six or seven speeds.

A powershift transmission also has complex electro-hydraulic controls to accommodate required synchronizer states. Some designs have relied on multiplexing clutch controls with synchronizer control in an attempt to deduce cost, which results in reduced operating performance, such as longer shift period, loss of repeatable high quality shifts, and an increased number of failure states.

SUMMARY OF THE INVENTION

A method for controlling a transmission includes using signals of first solenoids to control first and second clutches, servos of first gears and servos of second gears, using signals of a second solenoid to establish a flow rate to cool the clutches and to actuate the servo that is associated with a selected gear, and using signals of a third solenoid to direct the flow rate to one of the clutches and to engage the selected gear.

The invention comprehends a system for controlling a transmission including a first clutch for connecting a power source to odd-numbered gears, a second clutch for connecting a power source to even-numbered second gears, first servos for engaging the odd-numbered gears, second servos for engaging the even-numbered gears, a first solenoid producing first signals that control the first clutches, a second solenoid producing second signals that control the second clutch, the first and second signals determining whether the first servos or the second servos are controlled to engage a selected gear, a third solenoid producing signals that establish a flow rate to cool the clutches and to direct flow to one of the servos that is associated with the selected gear, and a fourth solenoid producing signals that direct the flow rate to one of the clutches and to direct flow to the selected gear.

The electro-hydraulic control requires fewer solenoids and valves than the number required for a conventional transmission control without multiplexing the clutch variable force solenoid (VFS) that provides synchronizer flow control.

The use multiplexed on/off solenoids reduces cost of the control system compared to the cost of conventional variable force solenoids.

The electro-hydraulic control includes stand-alone, clutch control VFSs, allowing greater independence between clutch control and synchronizer selection. The control has a dedicated VFS for synchronizer flow and pressure control, and synchronizer selection is a result of the valve selection network, which receives input signal from the clutch solenoids and clutch cooling control solenoids.

Normally multiplexing is considered undesirable due to potential interference between the tasks being performed. But since the need to provide lube and cooling flow to the input clutches occurs at a low frequency, a solenoid will normally be used for this function and will always switch from that function momentarily to control the servo valves. The duration of servo valve control is short and always has priority over lube and cooling flow to the input clutches.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a schematic diagram of transmission gearing that produces seven forward speeds and reverse drive;

FIG. 2 is a schematic diagram showing an end view of the gearing of FIG. 1.

DESCRIPTION OF THE PREFERRED EMBODIMENT

Figure 3:
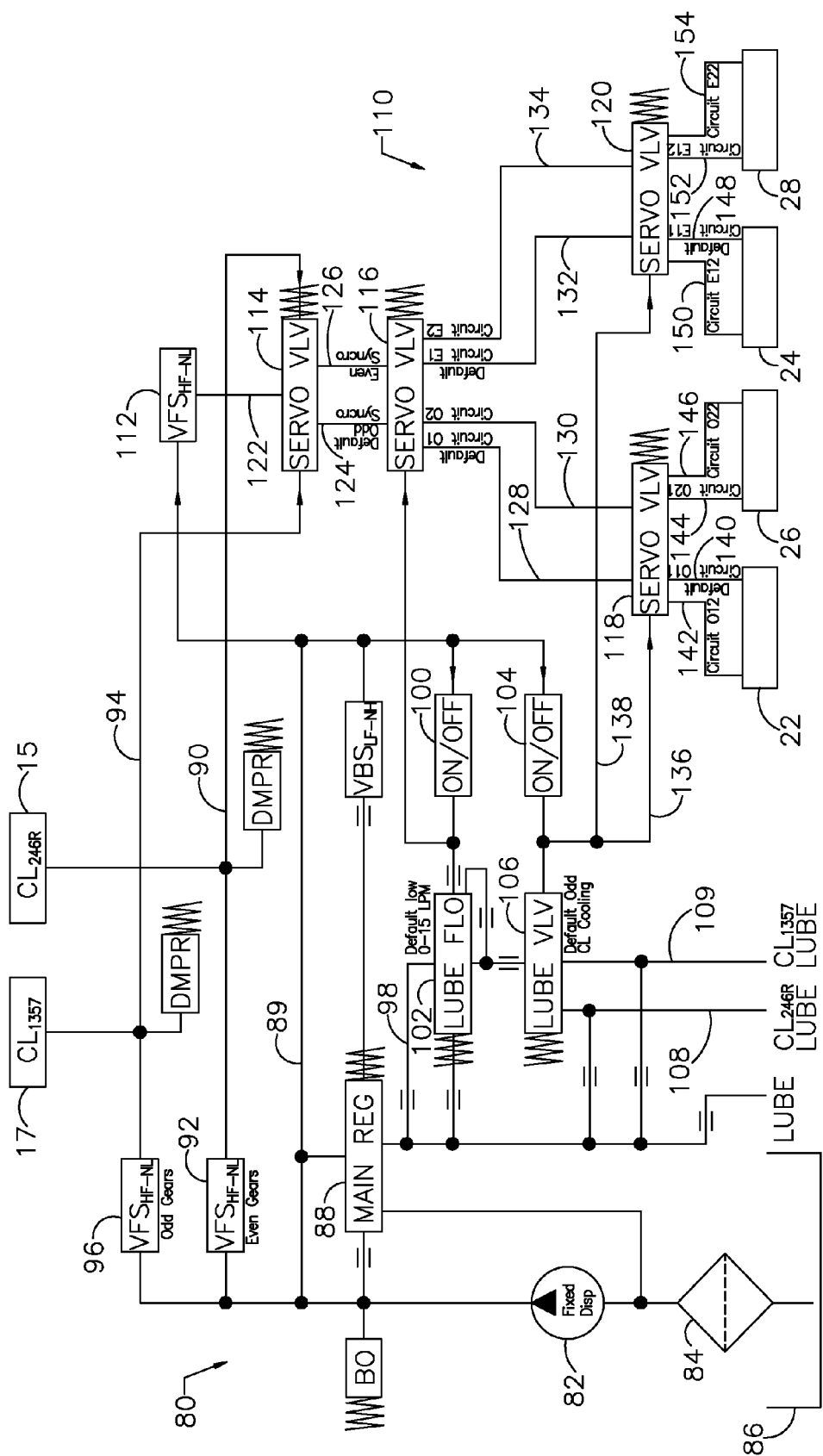
FIG. 3 is a schematic diagram of a hydraulic control system for the transmission of FIGS. 1 and 2.

Referring now to FIG. 1, a powershift transmission 10 includes first and second coaxial input shafts 11, 12, an output gear 14 driveably connected to the vehicle wheels (not shown); first, second and third layshafts 16, 18, 20, respectively; a 1-neutral synchronizer 22; a 6-2 synchronizer 24; a 3-5 synchronizer 26; a 4-R synchronizer 28; and a L synchronizer 30. Outer shaft 11 is driveably connected to an engine 13 through an input clutch 15. Inner shaft 12 is driveably connected to the engine through an input clutch 17.

Each layshaft 16, 18, 20 includes an output pinion 32, 34, 36, secured to the respective layshaft. Each synchronizer is secured to the layshaft on which it is supported and includes a selector sleeve having a neutral position from which it is moved axially along the shaft to secure a gear to the shaft. Input clutches 15, 17 include sets of clutch plates, which alternately engage and disengage mutually.

Secured to input shaft 12 are input pinions 38, 42, 46, 48. Secured to input shaft 11 are input pinions 40, 44. First gear 50 meshes with pinion 38 and is journalled on layshaft 16. Second gear 52 meshes with pinion 40 and is journalled on layshaft 16. Third gear 54 meshes with pinion 42 and is journalled on layshaft 18. Fourth gear 56 meshes with pinion 44 and is journalled on layshaft 18. Fifth gear 58 meshes with pinion 46 and is journalled on layshaft 18. Sixth gear 60 meshes with pinion 44 and is journalled on layshaft 16. Reverse gear 64 meshes with idler gear 68 and low gear 66 and is journalled on layshaft 18. Low gear 66 is journalled on layshaft 20. An idler gear 68, secured to second gear 52, is also journalled on layshaft 16 for rotation with gear 52 as a unit.

In operation, each of the gear ratios is produced by transmitting power from the engine 13, through one of the input clutch 15, 17, to the input shaft 11, 12 that corresponds to the desired gear. First gear results when the sector sleeve of synchronizer 22 is moved leftward into engagement with first gear 50 and the selector sleeves of the other synchronizers are in their neutral positions, thereby connecting input shaft 12 to output gear 14 through the mesh between pinion 38 and gear 50, and the mesh between output pinion 32 and output gear 14.

Second gear results when the selector sleeve of synchronizer 24 is moved rightward into engagement with idler 68 and the selector sleeves of the other synchronizers are in their neutral positions, thereby connecting input shaft 11 to output gear 14 through the mesh between pinion 40 and gear 52, and the mesh between output pinion 32 and output gear 14.

Third gear results when the selector sleeve of synchronizer 26 is moved leftward into engagement with third gear 54 and the selector sleeves of the other synchronizers are in their neutral positions, thereby connecting input shaft 12 to output gear 14 through the mesh between pinion 42 and gear 54, and the mesh between output pinion 34 and output gear 14.

Fourth gear results when the selector sleeve of synchronizer 28 is moved leftward into engagement with fourth gear 56 and the selector sleeves of the other synchronizers are in their neutral positions, thereby connecting input shaft 11 to output gear 14 through the mesh between pinion 44 and gear 56, and the mesh between output pinion 34 and output gear 14.

Fifth gear results when the selector sleeve of synchronizer 26 is moved rightward into engagement with fifth gear 58 and the selector sleeves of the other synchronizers are in their neutral positions, thereby connecting input shaft 12 to output gear 14 through the mesh between pinion 46 and gear 58, and the mesh between output pinion 34 and output gear 14.

Sixth gear results when the selector sleeve of synchronizer 24 is moved leftward into engagement with sixth gear 60 and the selector sleeves of the other synchronizers are in their neutral positions, thereby connecting input shaft 11 to output gear 14 through the mesh between pinion 44 and gear 60, and the mesh between output pinion 32 and output gear 14.

Reverse gear results when the selector sleeve of synchronizer 28 is moved rightward into engagement with reverse gear 64, and the selector sleeves of the other synchronizers are in their neutral positions. The reverse gear power path through transmission 10 includes input shaft 11, pinion 40, second gear 52, idler 68, reverse gear 64, synchronizer 28, layshaft 18, output pinion 34 and output gear 14.

The low or deep low launch gear results when the selector sleeve of synchronizer 30 is moved rightward into engagement with low launch gear 66, and the selector sleeves of the other synchronizers are in their neutral positions. The low gear power path through transmission 10 includes input shaft 11, pinion 40, second gear 52, idler 68, reverse gear 64, low gear 66, synchronizer 30, layshaft 20, output pinion 36 and output gear 14.

The final drive ratio, i.e., the mesh between pinions 32, 34, 36 and gear 14, has a speed ratio of about 4.5. The speed ratio produced in first gear by the mesh between pinion 38 and first gear 50 is about 4.5. Therefore, the first gear speed ratio produced by transmission 10 is about 20:1 (4.5×4.5). In low gear, however, transmission 10 produces a speed ratio, which is the result of a forward gear ratio (2nd gear), a reverse ratio, a low gear ratio and the final drive ratio (4.5). Therefore, a speed ratio of 20:1 is no longer a limit; instead speed ratios much greater than 20:1, e.g. speed ratios greater than 24:1, can be easily produced by transmission 10.

FIG. 3 is a schematic diagram of a hydraulic control circuit 80 for producing gear ratio changes in the transmission of the type shown in FIGS. 1 and 2. A fixed displacement pump 82 draws automatic transmission fluid (ATF) through a filter 84 from a sump 86. A main regulator 88 controls line pressure carried in line 89. Pressure in line 90, output from a valve controlled by a variable force solenoid (VFS) 92, actuates input clutch 15, and pressure in line 94, output from a valve controlled by a VFS 96, actuates input clutch 17.

When the state of an on/off solenoid 100 is low, i.e., off, the flow rate to lube valve 106 from lube flow valve 102, which is controlled by solenoid 100, is low, i.e., about 0.50 liters per minute (lpm) going to clutch lube circuits 108 and 109. Depending on the high/low state of the on/off solenoid 104, lube direction valve 106 directs the flow rate output from valve 102 to clutch 15 or clutch 17 through lines 108, 109, respectively. For example, if the state of on/off solenoid 100 is low and the state of an on/off solenoid 104 is high, a low flow rate is directed through line 109 to input clutch 17. If the state of on/off solenoid 100 is high and the state of an on/off solenoid 104 is high, a low flow rate is directed through line 108 to input clutch 15.

If the input clutch 17 for the odd-numbered gears is applied, VFS 112 controls the servos and the related synchronizers 24, 28 for the even-numbered gears and reverse gear. If the input clutch 15 for the even-numbered gears is applied, VFS 112 controls the servos and related synchronizers 22, 26 for the odd-numbered gears.

After a gear change event, in which one of the input clutches 15, 17 is newly engaged causing its temperature to rise, the desired flow rate of ATF lube to that input clutch increases to about 15.0 lpm. To produce an increase in flow rate, the state of on/off solenoid 100 goes high, valve 102 shuttles to a high flow rate position, and lube flow to the recently engaged input clutch increases to about 15.0 lpm.

The control circuit 80 also includes a servo control 110, which controls the synchronizer 22, 24, 26, 28, 30, whose state of engagement with a selected gear determines the operating gear produced by transmission 10. The servo control 110 includes a high flow rate VFS 112, a servo direction valve 114, and a servo valves 116, 118, 120.

The input of high flow rate VFS 112, which has a normally low state, is connected to the source of line pressure 89. The output of high flow rate VFS 112 is connected by line 122 to the input of servo direction valve 114.

Pressure signals produced by VFS 92 and VFS 96 are shared or multiplexed with the servo direction valve 114, whose left/right positional state determines whether an even-numbered gear or an odd-numbered gear of transmission 10 is to be connected by a synchronizer to the shaft on which the subject gear is journalled. For example, if servo direction valve 114 shuttles rightward due to input clutch 17 being engaged and input clutch 15 being disengaged, line 122 is connected to line 126, indicating that a synchronizer that actuates an even-numbered gear is being activated. If servo direction valve 114 shuttles leftward due to input clutch 15 being engaged and input clutch 17 being disengaged, line 122 is connected to line 124, indicating that a synchronizer that actuates an odd-numbered gear is being activated.

Lines 124, 126 connect the output of servo valve 114 to the input of servo valve 116. High/low pressure signals produced by on/off solenoid 100 are shared or multiplexed with the servo valve 116. The high/low pressure signal of on/off solenoid 100 in combination with the positional state of servo valve 114 determine whether the output of servo valve 116 is carried in line 128 or 130 to servo valve 118, or in lines 132 or 134 to servo valve 120.

For example, if servo direction valve 114 shuttles leftward and the state of on/off solenoid 100 is low, line 124 is connected to line 128 through servo valve 116, indicating that synchronizer 22 is being actuated. If servo direction valve 114 shuttles leftward and the state of on/off solenoid 100 is high low, line 124 is connected to line 130 through servo valve 116, indicating that synchronizer 26 is being actuated. If servo direction valve 114 shuttles rightward and the state of on/off solenoid 100 is low, line 126 is connected to line 132 through servo valve 116, indicating that synchronizer 24 is being actuated. If servo direction valve 114 shuttles rightward and the state of on/off solenoid 100 is high, line 126 is connected to line 134 through servo valve 116, indicating that synchronizer 28 is being actuated.

Pressure signals produced by on/off solenoid 104 are shared or multiplexed through lines 136, 138 with servo valves 118, 120, respectively. The state of servo valve 118 in combination with the state of lines 128, 130 determines which of the odd-numbered gears associated with synchronizer 22 is being activated. Similarly, the state of servo valve 118 in combination with the state of line 130 determines which of the odd numbered gears associated with synchronizer 26 is being activated.

For example for odd-numbered gear synchronizer engagement, when the state of on/off solenoid 104 is low and synchronizer 22 is being activated, pressure in line 128 is directed to line 140, thereby moving the sleeve of synchronizer 22 to disengage first gear moving the synchronizer to neutral. When the state of on/off solenoid 104 is high and synchronizer 22 is being activated, pressure in line 128 is directed to line 142, thereby moving the sleeve of synchronizer 22 to engage first gear. Similarly, when the state of on/off solenoid 104 is low and synchronizer 26 is being activated, pressure in line 130 is directed to line 144, thereby moving the sleeve of synchronizer 26 to engage fifth gear. When the state of on/off solenoid 106 is high and synchronizer 26 is being activated, pressure in line 130 is directed to line 146, thereby moving the sleeve of synchronizer 26 to engage third gear.

For even-numbered gear synchronizer engagement, when the state of on/off solenoid 104 is low and synchronizer 24 is being activated, pressure in line 132 is directed to line 150, thereby moving the sleeve of synchronizer 24 to engage second gear. When the state of on/off solenoid 104 is high and synchronizer 24 is being activated, pressure in line 132 is directed to line 148, thereby moving the sleeve of synchronizer 24 to engage sixth gear. Similarly, when the state of on/off solenoid 104 is low and synchronizer 28 is being activated, pressure in line 134 is directed to line 152, thereby moving the sleeve of synchronizer 28 to engage reverse gear. When the state of on/off solenoid 104 is high and synchronizer 28 is being activated, pressure in line 134 is directed to line 154, thereby moving the sleeve of synchronizer 28 to engage fourth gear.

In accordance with the provisions of the patent statutes, the preferred embodiment has been described. However, it should be noted that the alternate embodiments can be practiced otherwise than as specifically illustrated and described.

The invention claimed is:

1. A system for controlling a transmission, comprising:
   first and second clutches for connecting a power source to first gears and second gears;
   a first servo for directing pressure alternately to the first gears and the second gears;
   a second servo for directing pressure for the first gears from the first servo alternately to first and second circuits, and for the second gears from the first servo alternately to third and fourth circuits;
   a third servo for directing pressure from the first circuit alternately to a fifth circuit, through which a first portion of the first gears is actuated, and to a sixth circuit, through which a second portion of the first gears is engaged and disengaged;
   a fourth servo for directing pressure from the third circuit alternately to a seventh circuit, through which a first portion of the second gears is actuated, and to a eighth circuit, through which a second portion of the second gears is engaged and disengaged.

2. The system of claim 1, further comprising first solenoids producing signals that control the first and second clutches, wherein each of the first solenoids is a variable force solenoid.

3. The system of claim 1, further comprising a second solenoid producing signals that establish a flow rate to cool the clutches, wherein the second solenoid is an on/off solenoid.

4. The system of claim 1, further comprising a third solenoid producing signals that direct the flow rate to one of the clutches, wherein the third solenoid is an on/off solenoid.

5. The system of claim 2, wherein the signal produced by one solenoid of the first solenoids controls a torque transmitting capacity of the first clutch, and the signal produced by another solenoid of the first solenoids controls a torque transmitting capacity of the second clutch.

6. The system of claim 2, wherein the signal produced by one solenoid of the first solenoids establishes an engaged and disengaged state of the first clutch, and the signal produced by another solenoid of the first solenoids establishes an engaged and disengaged state of the second clutch.

7. The system of claim 1, wherein a selected gear is one of the second gears, and the first gears are controlled to engage a selected one of the first gears prior to engaging the one of the first and second clutches that is associated with the first gears.

8. The system of claim 1, wherein a selected gear is one of the first gears, and the second gears are controlled to engage a selected one of the second gears prior to engaging the one of the first and second clutches that is associated with the second gears.

9. A system for controlling a transmission, comprising:
   a first clutch for connecting a power source to odd-numbered gears;
   a second clutch for connecting a power source to even-numbered second gears;
   first servos for engaging the odd-numbered gears;
   second servos for engaging the even-numbered gears;
   a first solenoid producing first signals that control the first clutch;
   a second solenoid producing second signals that control the second clutch, the first and second signals determining whether the first servos or the second servos are controlled to engage a selected gear;

a third solenoid producing signals that establish a flow rate to cool the clutches and to actuate one of the servos that is associated with the selected gear; and a fourth solenoid producing signals that direct the flow rate to one of the clutches and to engage the selected gear.

10. The system of claim 9, wherein the first and second solenoids are variable force solenoids.

11. The system of claim 9, wherein the third and fourth solenoids are on/off solenoids.

12. The system of claim 11 where solenoids are modulated during a gear change.

13. The system of claim 9, wherein the signal produced by the first solenoid establishes an engaged and disengaged state of the first clutch, and the signal produced by the second solenoid establishes an engaged and disengaged state of the second clutch.

14. The system of claim 9, wherein the selected gear is one of the even-numbered gears, and the first servos are controlled to engage the selected gear prior to engaging the first clutch.

15. The system of claim 9, wherein the selected gear is one of the odd-numbered gears, and the second servos are controlled to engage the selected gear prior to engaging the second clutch.

16. A system for controlling a transmission, comprising:
a first clutch for connecting a power source to first gears;
a second clutch (15) for connecting the power source (13) to second gears a first servo for directing pressure alternately to the first gears and the second gears;

a second servo for directing pressure for the first gears and the second gears alternately to first, second, third and fourth circuits;

a third servo for directing pressure from the first circuit alternately to fifth and sixth circuits through which two of the first gears are actuated, respectively;

a fourth servo directing pressure from the third circuit alternately to seventh and eighth circuits through which two of the second gears are engaged, respectively.

17. A method, comprising:
using a first clutch to connect a power source to first gears;
using a second clutch to connect the power source to second gears;
using a first servo to direct pressure to the first gears;
using a second servo to direct pressure for the first gears and second gears alternately to first, second, third and fourth circuits;
using a third servo to direct pressure from the first circuit alternately to fifth and sixth circuits, through which two of the first gears are engaged, respectively;
using a fourth servo to direct pressure from the third circuit alternately to seventh and eighth circuits through which two of the second gears are engaged, respectively.

* * * * *